United States Patent
Calder et al.

(10) Patent No.: US 11,922,198 B2
(45) Date of Patent: *Mar. 5, 2024

(54) ASSIGNMENT OF RESOURCES IN VIRTUAL MACHINE POOLS

(71) Applicant: Microsoft Technology Licensing, LLC, Redmond, WA (US)

(72) Inventors: Bradley Gene Calder, Bellevue, WA (US); Ju Wang, Redmond, WA (US); Vaman Bedekar, Redmond, WA (US); Sriram Sankaran, Bellevue, WA (US); Marvin McNett, II, Redmond, WA (US); Pradeep Kumar Gunda, Bellevue, WA (US); Yang Zhang, Issquah, WA (US); Shyam Antony, Bellevue, WA (US); Kavitha Manivannan, Redmond, WA (US); Hemal Khatri, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/534,403

(22) Filed: Nov. 23, 2021

(65) Prior Publication Data

US 2022/0156098 A1    May 19, 2022

Related U.S. Application Data

(60) Continuation of application No. 16/278,665, filed on Feb. 18, 2019, now Pat. No. 11,194,604, which is a
(Continued)

(51) Int. Cl.
G06F 9/455 (2018.01)
G06F 9/50 (2006.01)
H04L 47/70 (2022.01)

(52) U.S. Cl.
CPC ...... *G06F 9/45533* (2013.01); *G06F 9/45558* (2013.01); *G06F 9/5033* (2013.01);
(Continued)

(58) Field of Classification Search
None
See application file for complete search history.

(56) References Cited

U.S. PATENT DOCUMENTS 8,065,676 B1    11/2011    Sahai et al.
8,918,784 B1 *  12/2014    Jorgensen ........... G06F 9/45558
                                                 718/1
(Continued)

FOREIGN PATENT DOCUMENTS

EP    2375328 A2    10/2011

OTHER PUBLICATIONS

"Office Action Issued in European Patent Application No. 17169977.0", dated Oct. 5, 2021, 4 Pages.
(Continued)

*Primary Examiner* — Eric C Wai
(74) *Attorney, Agent, or Firm* — Workman Nydegger

(57) ABSTRACT

Systems and methods are provided for assigning and associating resources in a cloud computing environment. Virtual machines in the cloud computing environment can be assigned or associated with pools corresponding to users as dedicated, standby, or preemptible machines. The various states provide users with the ability to reserve a desired level of resources while also allowing the operator of the cloud computing environment to increase resource utilization.

20 Claims, 13 Drawing Sheets

Related U.S. Application Data continuation of application No. 14/526,447, filed on Oct. 28, 2014, now Pat. No. 10,241,812, which is a division of application No. 13/346,416, filed on Jan. 9, 2012, now Pat. No. 8,904,008.

(52) U.S. Cl.
CPC ............ *G06F 9/5072* (2013.01); *H04L 47/70* (2013.01); *G06F 2009/4557* (2013.01); *G06F 2209/5011* (2013.01); *G06F 2209/5014* (2013.01)

(56) References Cited

U.S. PATENT DOCUMENTS

| | | | |
|---|---|---|---|
| 10,095,533 B1* | 10/2018 | Dravid | G06F 9/5088 |
| 2011/0029970 A1 | 2/2011 | Arasaratnam | |
| 2011/0078303 A1 | 3/2011 | Li et al. | |
| 2011/0167421 A1 | 7/2011 | Soundararajan et al. | |
| 2011/0185063 A1 | 7/2011 | Head et al. | |
| 2013/0060946 A1* | 3/2013 | Kenneth | G06F 9/45558 709/226 |
| 2013/0145004 A1* | 6/2013 | Kumhyr | G06F 8/65 709/223 |

OTHER PUBLICATIONS

"Office Action Issued in European Patent Application No. 12864816. 9", dated Aug. 31, 2022, 9 Pages.
U.S. Appl. No. 16/278,665, filed Feb. 18, 2019.
U.S. Appl. No. 14/526,447, filed Oct. 28, 2014.
U.S. Appl. No. 13/346,416, filed Jan. 9, 2012.
"Office Action Issued in European Patent Application No. 17169977. 0", dated Mar. 1, 2023, 4 Pages.
U.S. Appl. No. 13/346,375, filed Jan. 9, 2012.
U.S. Appl. No. 13/346,348, filed Jan. 9, 2012.
U.S. Appl. No. 14/923,318, filed Oct. 26, 2015.
U.S. Appl. No. 13/346,303, filed Jan. 9, 2012.
U.S. Appl. No. 16/165,255, filed Oct. 19, 2018.
U.S. Appl. No. 62/732,470, filed Sep. 17, 2018.
U.S. Appl. No. 16/188,834, filed Nov. 13, 2018.
Office Action Received for European Application No. 12864816.9, dated Dec. 11, 2023, 9 pages.

* cited by examiner

ASSIGNMENT OF RESOURCES IN VIRTUAL MACHINE POOLS

CROSS-REFERENCE TO RELATED APPLICATIONS

This application is a Continuation Application of U.S. patent application Ser. No. 16/278,665, filed on Feb. 18, 2019, entitled, "ASSIGNMENT OF RESOURCES IN VIRTUAL MACHINE POOLS," which is a Continuation Application of U.S. patent application Ser. No. 14/526,447, filed on Oct. 28, 2014, now U.S. Pat. No. 10,241,812, entitled "ASSIGNMENT OF RESOURCES IN VIRTUAL MACHINE POOLS," which is a Divisional application of and claims priority from U.S. patent application Ser. No. 13/346,416 filed on Jan. 9, 2012, now U.S. Pat. No. 8,904,008, entitled "ASSIGNMENT OF RESOURCES IN VIRTUAL MACHINE POOLS," the entire contents of each application being herein incorporated by reference.

This application is related in subject matter to the following concurrently filed U.S. Patent Applications: U.S. patent application Ser. No. 13/346,334, entitled "PLATFORM AS A SERVICE JOB SCHEDULING," U.S. patent application Ser. No. 13/346,303, now U.S. Pat. No. 9,170,849, entitled "DECOUPLING PAAS RESOURCES, JOBS, AND SCHEDULING," U.S. patent application Ser. No. 13/346,375, entitled "PRICING OF RESOURCES IN VIRTUAL MACHINE POOLS," and, U.S. patent application Ser. No. 13/346,348, now U.S. Pat. No. 9,372,735, entitled "PAAS HIERARCHIAL SCHEDULING AND AUTO-SCALING," the entireties of the aforementioned applications are incorporated by reference herein.

BACKGROUND

Conventional methods for performing large scale computational jobs often involved a user purchasing of computer hardware to serve as a computing platform. This can lead to variety of inefficiencies, as many typical users have a peak level of computing need that differs from the routine need for computing resources. Purchasing sufficient hardware to meet peak resource need can lead to low usage of computing resources. Alternatively, matching hardware to routine usage level can cause some desired computations to be impractical. More recently, improvements in processing speed and network transmission speed have made cloud computing environments a viable alternative to local computing platforms.

SUMMARY

In various embodiments, systems and methods are provided for assigning and associating resources in a cloud computing environment. Virtual machines in the cloud computing environment can be assigned or associated with pools corresponding to users as dedicated, standby, or preemptible machines. The various states provide users with the ability to reserve a desired level of resources while also allowing the operator of the cloud computing environment to increase resource utilization.

This Summary is provided to introduce a selection of concepts in a simplified form that are further described below in the Detailed Description. This Summary is not intended to identify key features or essential features of the claimed subject matter, nor is it intended to be used as an aid, in isolation, in determining the scope of the claimed subject matter.

BRIEF DESCRIPTION OF THE DRAWINGS

The invention is described in detail below with reference to the attached drawing figures, wherein.

DETAILED DESCRIPTION

Overview

Figure 1:
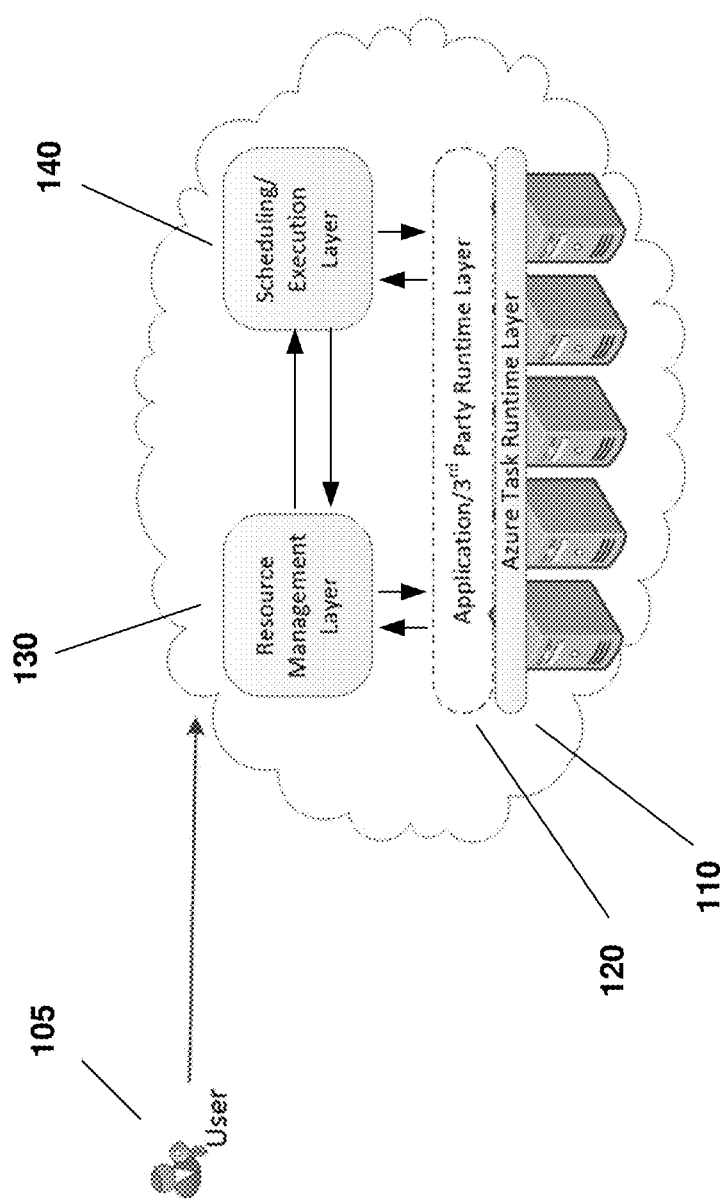
FIG. 1 schematically shows an example of a system or component suitable for use in implementing a cloud computing environment.

Due to increases in the speed of data transmission over networks and improvements in other network features, it is increasingly possible to perform large scale computing tasks in an environment where computing resources are distributed over a large network. A user in a first location can submit a job or computing task to a computing service and have the task performed on a group of computers that the user has no direct knowledge of. The computing resources for performing the user's task may be distributed over multiple locations. A first group of computing resources located in one or more locations can store the data and other information for performing the user's computing task, while a second group of computing resources, in the same locations or possibly in a different set of one or more locations, can be used to perform the computing task.

Access to a variety of distributed computing resources allows a user to perform job tasks without concern for where the computing resources are located. The distributed resources also provide an opportunity for a user to scale up (or scale down) the amount of resources used in order to meet goals for a computing task, such as completing the computing task by a specified time. However, providing this flexibility for the user poses a number of challenges for the operator (or owner) of the distributed computing resources. In order to meet demand, the operator of a distributed network of resources will preferably have sufficient available resources to satisfy resource requests at times of peak demand.

Definitions

An "account" is a global uniquely identified entity within the cloud computing environment. In an embodiment, all of the resources and tasks discussed below are scoped within an account. Typically, a user will create an account first before using the resources of a cloud computing system. After creating the account, the user can use the account to submit work items to the system and manage resources for performing jobs based on the work items.

A "work item" is a static representation of a job to be run in the cloud computing environment. A work item can specify various aspects of a job, including job binaries, pointers to the data to be processed, and optionally the command line to launch tasks for performing the job. In addition, a work item may specify the reoccurrence schedule, priority and constraints. For example, a work item can specify to be launched every day at 5 PM.

A "job" is a running instance of a work item. A job contains a collection of tasks that work together to perform a distributed computation. The tasks can run on one or more virtual machines in the cloud computing environment.

A "task" is the fundamental execution unit of a job. Each task runs on a virtual machine, Users can specify additional input to the command line and pointers to input data for each task. A task may create a hierarchy of files under its working directory on the virtual machine performing the task during the course of execution of the task.

A "job manager task" (JM task) is a special task in a job. A job manager task is optional, so some jobs can be performed without the use of a JM task. A job manager task provides a single control point for of the tasks within a job and can be used as the "master" task for the job. If a job has a JM task, the system launches the JM task as the first task in the job. The JM task can then submit more tasks to the job, and it can monitor the progress of these tasks and control when to submit the next batch of tasks. In this way, the JM task can coordinate the scheduling of all the tasks in a job and manage dependencies among tasks. Preferably, if the node or virtual machine for the job manager task fails, the JM task is restarted automatically on another virtual machine so that the JM task is always running for the corresponding job. In addition, users can specify to the system that once the JM task completes, the system can terminate all the tasks in the corresponding job.

Virtual Machine Pools

A virtual machine refers to a logical unit of processing capability. A virtual machine can have a one to one correspondence with a physical processor, or a virtual machine can correspond to a plurality of processors, or a virtual machine can represent a percentage of processing time on one or more processors. A virtual machine assigned to a pool can perform one or more tasks for the pool at any given time.

In various embodiments, the virtual machines that may potentially perform a job based on a work item are assigned to at least one pool corresponding to the account (i.e., the user) for the work item prior to use. A "pool" is a logical grouping of virtual machines. A work item always has at least one associated pool to run the job(s) corresponding to the work item. Each account can create one or more pools to which the account gets access for use in performing work items associated with the account. Typically an account has exclusive access to pools associated with the account. A pool can be created when a work item is submitted by a user, or a work item can be associated with an existing pool. A pool may be created automatically by the system to perform a job. For example, a reoccurring work item that runs at a specific time each day can be handled by having a pool automatically created to perform the job at the start time. The pool can be deleted each day after completing the reoccurring work item. Optionally, a pool can be associated for use with a single work item, a single job, or another subset of the work items corresponding to an account.

When a work item is submitted by a user, the work item can be associated with one or more pools of virtual machines. The virtual machines can be organized within a pool in any convenient manner, For example, all virtual machines can be organized in or assigned to a single pool regardless of the geographic location of the underlying processor for the virtual machine. Another option is to organize virtual machines based on geographic location, so that all virtual machines for a pool are in a given geographic location. Still another option is to organize virtual machines on a basis other than geographic location, such as proximity to other variables (e.g., storage resources, network latencies, user location/preference, security requirements). Yet another option is to automatically create a pool when a work item or job is created, and then tear down the pool with the work item or job is finished.

Virtual machine pools represent one method for organizing virtual machines, Another organizational unit for virtual machines is a virtual machine duster. A virtual machine cluster represents a group of virtual machines that are managed together by a process in the cloud environment, such as a task tenant process, The virtual machines in a virtual machine cluster can correspond to physical machines that are grouped together in a convenient manner. For example, a virtual machine cluster can correspond to a group of physical machines that are located in the same geographic region, such as in the United States or in a northeast portion of the United States; in the same general location, such as in a city or metropolitan area like Seattle or San Diego County; or in the same specific location, such as in one or more connected or nearby buildings that form a computing or data center. Another option is to form a virtual machine cluster based on a group of physical machines that have a favorable data transfer rate with a specified portion of storage in the cloud environment. Still another option is to form multiple virtual machine clusters based on the physical machines at a given location. A virtual machine pool can span across a plurality of virtual machine clusters. A process for managing a virtual machine cluster, such as a task tenant, can assign and unassign virtual machines from a virtual machine pool. A task tenant (or other process for managing a virtual machine cluster) can also schedule tasks on a virtual machine within a cluster based on a queue of jobs corresponding to the pool the virtual machine is assigned to. When a task tenant needs additional machines in order to assign a sufficient number to a virtual machine pool, the task tenant can obtain additional virtual machines from the general cloud computing environment. Similarly, if a task tenant has an excess of virtual machines, the task tenant can return the excess machines to the general cloud computing environment.

Dedicated, Standby, and Preemptible Machines

When a virtual machine is assigned to a pool, the virtual machine can be assigned as one of two types. The virtual machine can be assigned to the pool as a dedicated virtual machine or a preemptible virtual machine. The status of a virtual machine as dedicated or preemptible can also change while the virtual machine is in a pool.

A "dedicated" virtual machine is a machine assigned to a pool for dedicated use by work items or jobs assigned to the pool. Optionally, a dedicated virtual machine may be assigned for dedicated use for one or more associated work items, as opposed to being generally available for any job submitted to the pool. While a virtual machine has a dedicated status, the machine is reserved for use by the account associated with the pool. A dedicated machine is not provisioned with resources from other accounts and does not perform jobs on behalf of other accounts.

A "preemptible" virtual machine is a virtual machine that is currently performing a task in a pool on behalf of an account, but without a guarantee that the virtual machine will continue to be assigned to and available for that pool. When a preemptible virtual machine is made available to a pool, the preemptible machine is assigned to that pool. The preemptible machine is then provisioned and used to perform a job for that pool. The preemptible machine can be made available to the pool by any convenient method, such as by having the pool (on behalf of the corresponding account) win processing time on the preemptible virtual machine in a resource auction.

An additional factor in assigning dedicated and preemptible virtual machines is whether the request for the virtual machine includes an affinity for a particular virtual machine cluster. An affinity for a virtual machine cluster can be based on a variety of reasons. One example of a request for affinity to a virtual machine cluster is due to a desire or need to have a virtual machine with improved access (such as high data transfer speeds) to data, storage for a job that will be performed on a virtual machine. For this type of storage affinity, the affinity request can specify assignment of virtual machines from one or more virtual machine dusters that have the desired access to data. This can represent, for example, a group of virtual machines that correspond to physical machines that have a desired physical data connection to a data, storage center. Another type of affinity is job affinity. Some types of jobs performed by virtual machines can involve substantial amounts of communication between virtual machines working on the same or a similar job. In a job affinity situation, it can be beneficial to have all virtual machines working on a job to be located within a single virtual machine cluster (or other virtual machine organizational unit), in order to facilitate message passing between the virtual machines. Selecting virtual machines from a single virtual machine duster can correspond to selecting virtual machines that correspond to physical machines in the same geographic location.

A virtual machine made available for use to an account as a preemptible virtual machine will typically be a virtual machine that has another purpose in the cloud computing environment. For example, one source of preemptible virtual machines are virtual machines provisioned by the cloud computing environment owner/operator for disaster recovery purposes. In order to provide stable operation, a cloud computing environment may include one or more groups virtual machines that are held in reserve. These reserve virtual machines are available to replace resources that are lost due to a processor failure, network failure, or any other kind of event that results in a portion of the cloud environment being no longer suitable for performing jobs. When one or more dedicated virtual machines assigned to a pool. are lost due to an event, the lost machines can be replaced using the reserve virtual machines. This improves the availability of resources in the cloud computing environment. However, since it is desirable for failure events to be rare, having a reserve of disaster recovery machines will often mean that a large number of virtual machines are sitting idle waiting to be used. Rather than wasting the CPU cycles of these virtual machines designated for handling failure events, the CPU cycles of these virtual machines can be assigned to pools as preemptible virtual machines to run work items or jobs. If a failure occurs, and the system needs to take preemptible resources away to fill the requirements of dedicated resources, a preemptible job running on such a virtual machine will be stopped as soon as is feasible (and possibly immediately) so that the preemptible virtual machine can be used for its original purpose of replacing a lost or failed resource.

Another source of preemptible machines is excess capacity virtual machines, Typically, the peak load of any network will be different from the average load. As a result, a computing environment with sufficient resources to handle a peak load situation will often have excess resources available during other times. These excess resources provide a resource cushion. When a user makes a request for additional dedicated virtual machines, the excess virtual machines can be used to fulfill the user's request. When the cloud computing environment has a load that is less than the peak load for dedicated machines, one or more virtual machines will be free. Rather than wasting the CPU cycles of these virtual machines designated for providing spare capacity, the CPU cycles of these virtual machines can be assigned to users and pools on a preemptible basis. As the load of requests for dedicated virtual machines increases, preemptible jobs running on these excess virtual machines will be stopped as soon as is feasible (and possibly immediately). This allows the preemptible virtual machine to be used for its original purpose of providing additional dedicated resources when needed. Additionally or alternately, some increases in the load for dedicated machines will be due to scheduled requests for dedicated machines. If a virtual machine is going to become unavailable due to use as a dedicated machine at a scheduled time, a preemptible job assigned to the virtual machine may be stopped prior to the scheduled time to allow for an orderly transition from the preemptible job to the dedicated resources.

In some situations, a user may desired to have access to a larger number of dedicated machines at some future time. In this situation, a user can reserve one or more virtual machines as standby virtual machines. A "standby reservation of virtual machines is a reservation associated with a pool or account for virtual machines to be assigned to the pool or account for use at some point in the future. Provisioning the virtual machine for use can mean merely that sufficient virtual machine resources are identified and/or reserved within the cloud computing environment, so that virtual machine resources will be available for conversion to dedicated virtual machines when requested. Optionally, provisioning the standby machine can also include provisioning the virtual machine with data, executables, or a combination thereof.

A standby virtual machine reservation is not an allocation or assignment of a virtual machine. Instead, a standby virtual machine reservation reserves the right in the future for an idle or preemptible virtual machine to be converted to a dedicated virtual machine assigned to the user or pool associated with the standby reservation. The preemptible job can be a job associated with the pool or account associated with the standby reservation, another different pool, or another different account. When a standby reservation is made by a pool or account, a virtual machine from a virtual machine duster is not assigned to the pool or account. Instead, a count is kept of the number of standby reservations corresponding to the virtual machine cluster, so that a sufficient number of idle or preemptible virtual machines are available to satisfy the standby reservations corresponding to the virtual machine cluster.

A virtual machine standby reservation can be associated with a pool for a variety of reasons. One use for standby machines is for users that have high priority computation jobs that occur only during a specific time frame. For example, a financial company may wish to perform analysis of the daily activity of one or more financial markets, such as a stock exchange or a commodities exchange. The financial markets open and close on a defined schedule, such as opening at 9:30 AM and closing at 4:00 PM. The financial company would like to aggregate data from the hours the financial markets are open for use in performing analysis or simulations. The goal of the analysis is to provide information for their employees before the markets open the following day. Such analysis can require a large number of virtual machines, but the virtual machines are needed only between the hours of, for example, from 6:00 PM until 3:30 AM the following morning. During this time the financial company desires a guarantee of availability of the virtual machines. During the rest of the day, the financial company does not need the machines. Associating virtual machine reservations with the account of the financial company can achieve this goal. In exchange for paying a reservation price, the financial company is guaranteed the availability of the machines during the desired times. Outside of the desired time window, the virtual machines can be used as preemptible machines for the financial company and/or other users.

Standby reservations can be used to convert idle or preemptible virtual machines to dedicated machines assigned to a pool corresponding to a user based on time-based criteria or load-based criteria. In some situations, a standby reservation can cause conversion of an idle or preemptible virtual machine to a dedicated virtual machine based at least in part on a predetermined time and/or date. In such a situation, a preemptible virtual machine being converted to a dedicated virtual machine based on the standby reservation can be stopped in an orderly manner prior to the scheduled availability event. This is defined as a standby reservation having time-based criteria. Time-based criteria are in contrast to load-based criteria which are used to define a load-based threshold. A load-based threshold corresponds to a. threshold based on usage and/or performance of one or more cloud resources. Preferably, a load-based threshold excludes the use of a time-based criteria. In addition to time-based criteria and load-based criteria, still another option for converting one or more virtual machines corresponding to a standby reservation to dedicated virtual machines is based on a. request from a user or a system administrator.

Another use for a standby reservation is to allow for improved performance when scaling out a job. For example, a retail store may use cloud computing resources to handle additional on-line traffic during the shopping season in advance of a holiday, such as on-line traffic for reviewing the retailer's website and placing orders. Based on past experience, the retailer expects a certain level of on-line activity, and reserves a corresponding number of dedicated virtual machines. However, in the event that on-line activity is greater than expected, the retailer also reserves additional machines via a standby reservation. The retailer can then set up one or more thresholds that indicate a higher than expected level of activity. As these thresholds occur, the standby reservation can be used to convert idle or preemptible virtual machines to dedicated machines to allow the retailer to handle the additional on-line traffic without having the customers of the retailer experience slow response times. In this situation, a standby reservation may be converted to a dedicated machine at an unpredictable time, as it may not be known when an activity threshold will be satisfied. When an activity threshold is met, idle or preemptible virtual machines are converted to dedicated virtual machines assigned to a pool associated with the standby reservation. If a preemptible task is running on the virtual machine prior to conversion, the preemptible task is stopped prior to converting the virtual machine to a dedicated machine. Optionally, the activity threshold does not include a time-based criteria.

Example of Organization of Computing Resources in a Distributed Network Environment A user of a cloud computing environment will typically desire to perform jobs using the cloud computing resources. The jobs will typically involve performing jobs on data that is stored in locations that are accessible via the cloud computing environment. One way for an operator to provide a cloud computing environment is to provide the environment as a number of layers. FIG. 1 schematically shows an example of a system suitable for performing tasks within a cloud computing environment. The system in FIG. 1 includes a task runtime layer 110, a third party task runtime layer 120, a resource management layer 130, and a scheduling and execution layer 140.

In the embodiment shown in FIG. 1, the task runtime layer 110 is responsible for setting up the execution environment and security context for tasks from a user 105. The task runtime layer 110 can also launch tasks and monitor the status of the tasks. The task runtime layer 110 can take the form of a system agent running on each virtual machine. The task runtime layer may also include a runtime library that can be linked into a users' task executables. Having runtime libraries as part of the task runtime layer 110 can potentially provide richer capability to tasks executed by the system agent. Examples of runtime libraries include one or more efficient communication libraries to allow fast communication among tasks; an efficient remote file access library support to read files from other virtual machines and/or other tasks; a checkpoint library to allow tasks to checkpoint (e.g. into binary large objects) and resume; a logging library; and a library tor providing a distributed file system to be used across virtual machines performing a given task within a pool of virtual machines.

The third party task runtime layer 120 allows additional runtimes to be built and run on top of task runtime layer 110. The third party task runtime layer 120 also can provide additional capabilities for coordinating the running of tasks for a job. Examples may include a MapReduce runtime to a library for providing a distributed file system to be used across virtual machines performing a given task within a pool of virtual machines. This allows a user to organize the cloud computing environment in a manner tailored for the user's jobs or tasks. In some embodiments, a job manager task can facilitate allowing a. user to use a third party runtime layer to run and/or control cloud computing resources.

Resource management layer 130 deals with managing the computing resources available in the cloud computing environment. One option is to have the resource management layer 130 manage the resources at three different levels. At a first level, the resource management layer 130 manages the allocation and deallocation of virtual machines associated with a job (i.e., execution of a work item) as well as the files stored on each virtual machine associated with a task. At a second level, the virtual machines associated with a job can be grouped into pools of machines. A pool can contain virtual machines associated with one or more jobs and/or work items. Depending on the embodiment, a single pool can span across multiple virtual machine clusters, such as all virtual machine clusters in a data center, a plurality of virtual machine clusters across a plurality of data centers within a geographic region, or a plurality of clusters across data centers in a plurality of geographic regions. A single pool can contain a large number of virtual machines, such as millions. The virtual machines can be contained in a large number of pools, such as up to billions. At a third level, the resource management layer manages the amount of virtual machines available for association with jobs or work items in a given group of pools. This allows for dynamic adjustment of the amount of compute resources used based on the current load of the system. Additionally, virtual machines that are not being used by a current group of pools may be released back to the cloud computing environment for incorporation into other groups of pools.

In the embodiment shown in FIG. 1, scheduling, and execution layer 140 manages work items, jobs, and tasks that are being performed by a user. The scheduling and execution layer 140 makes scheduling decisions and is responsible for launching jobs and tasks as well as retries on failures. Such a scheduling and execution layer 140 can include components for managing jobs and/or tasks at various levels.

Figure 2:
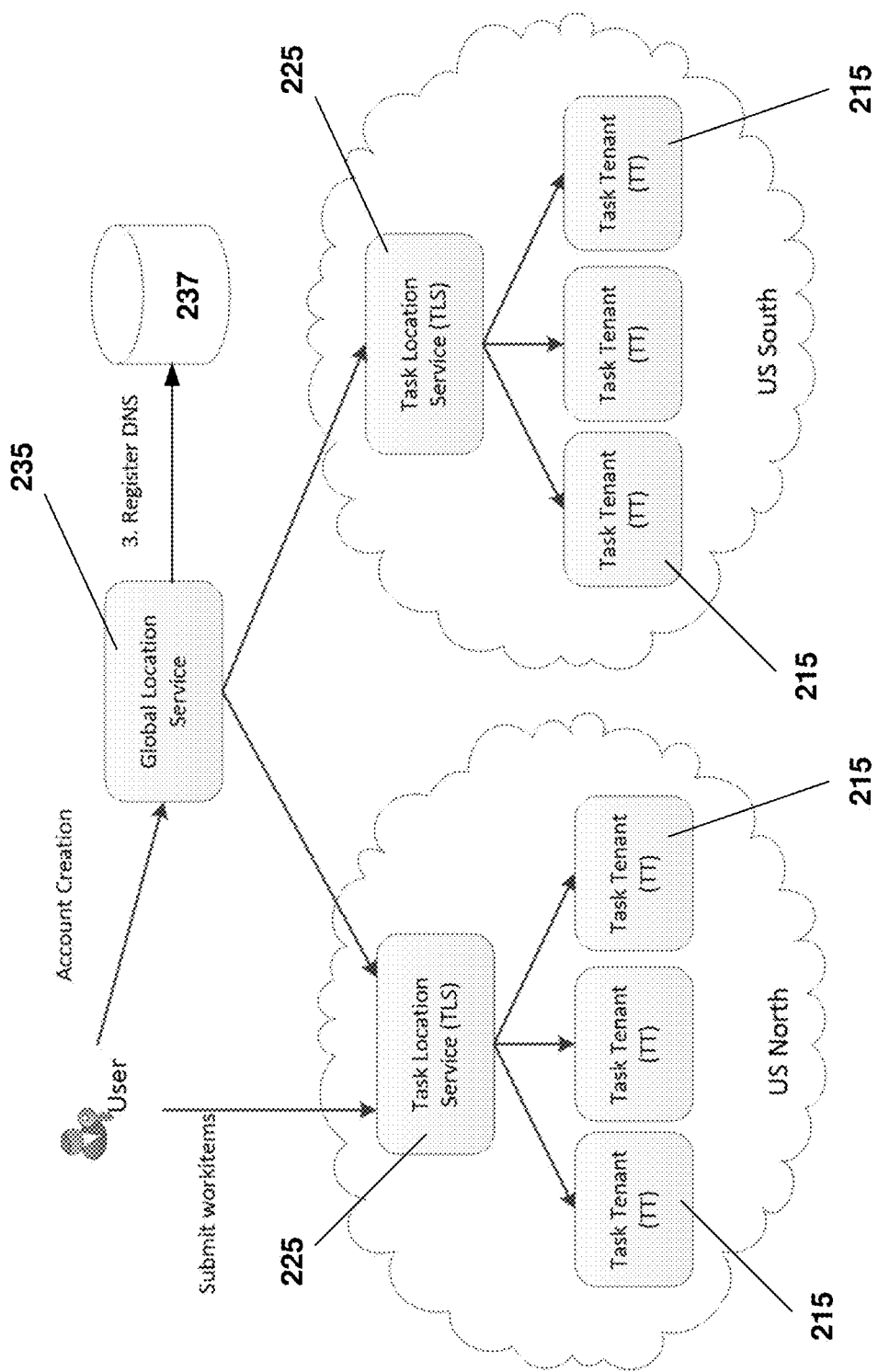
FIG. 2 schematically shows an example of a system or component suitable for use in implementing a cloud computing environment.

The layers described above can be implemented in a cloud computing environment that includes processors at multiple geographic locations. FIG. 2 schematically shows an example of how processors at different locations can be integrated within a single cloud computing architecture.

In FIG. 2, one or more task tenants 215 can be used to manage pools of virtual machines. A task tenant 215 can maintain a set of virtual machines. The jobs of one or more users can run on the virtual machines within a task tenant 215 as part of one or more pools of virtual machines. One or more task tenants 215 can be used in a given geographic region. The responsibilities of a task tenant 215 can include maintaining the set of virtual machines and dynamically growing or shrink the task tenant based on the resource utilization within the task tenant. This allows a task tenant 215 to increase the number of virtual machines within the task tenant to accommodate increased customer demand. This also allows a task tenant 215 to release unused virtual machines so that the virtual machines can be allocated. to other hosted services in the data center handling service for other customers. Another responsibility of a task tenant 215 can be implementing part of the pool allocation/deallocation/management logic. This allows the task tenant 215 to participate in determining how virtual machines are assigned to pools associated with a task for a customer. The task tenant 215 can also be responsible for scheduling and execution of tasks on the virtual machines within the task tenant.

In the embodiment shown in FIG. 2, one or more task location services 225 are provided that control a plurality of task tenants 215. The plurality of task tenants can correspond to all task tenants in a given geographic region, various task tenants from around the world, or any other convenient grouping of task tenants. In FIG. 2, task location services 225 are shown that serve regions labeled "US North" and "US South". The responsibilities of a task location service 225 can include management of task accounts for the given geographic region. The task location services 225 can also provide application programming interfaces (APIs) for allowing users to interact with the cloud computing environment. Such APIs can include handling APIs associated with pools of virtual machines, pool management logic, and coordination of pool management logic across task tenants within a given geographic region. The APIs can also include APIs for handling tasks submitted by a user, as well as maintaining, scheduling, and terminating work items or jobs associated with the user tasks. The APIs can further include APIs for statistics collection, aggregation, and reporting for ad work items, jobs, tasks, and pools in a geographic region. Additionally, the APIs can include APIs for allowing auction of available virtual machines as preemptible virtual machines to users on a short term basis based on a spot market for virtual machines. The APIs can also include APIs for metering usage and providing billing support.

The task location services 225 can be linked together by a global location service 235. The global location service 235 can be responsible for account creation and management of accounts, including managing task accounts in conjunction with the task location service tenants 225. This includes being responsible for disaster recovery and being responsible for availability of work items and jobs if there is a major data center disaster. This may include running a work item or job in a different location due to a data center not being available for any reason. This can also include allowing customers to migrate their work items, jobs, and pools from one data center to another data center. Typically there will be only one active global location service 235. This active global location service 235 is in communication with the various task location services 225 as well as service components for managing data storage (not shown). The global location service can maintain a global account namespace 237.

As an example of operation of the system in FIG. 2, a hypothetical customer or user 217 can create task account via an interface provided by the global location service 235. In this example, the hypothetical customer is referred to as Sally. The user request to create a task account may optionally specify a geographic region that the account needs to be created in. In this example, Sally requests an account associated with the US North region. In response, the global location service 235 contacts the task location service 2 25 that corresponds to the requested geographic region (US North) to create the account. If a region is not requested, the task account can be created in a region selected by any convenient method, such as based on a location associated with the requesting user. The global location service 235 also contacts at least another region, such as US South, so that a disaster recovery copy of the account is created. Optionally, Sally could request that US South serve as the failover region for disaster recovery, or US South could be automatically assigned by the system by any convenient method. The task location service 225 maintains all the information for all the accounts in its geographic region. After successfully creating the account in the task location services 225 for US North and US South, the global location service 235 registers the task service endpoint for Sally's account to point to the virtual IP address of the task location service 225 for US North. For example, a domain name service (DNS) record can be created to map a host name such as "sally.task.core.windows.net" to the virtual IP address of the task location service 225 in US North. This completes the creation of the task account for Sally. If a data center disaster occurs at a future time, the global location service 235 can update the DNS record to point to US South.

After the account is created, the customer Sally can access the account and send requests to access the APIs for interacting with the cloud computing environment against the hostname "sally.task.core.windows.net". For example, Sally can access an API to issue a request to create a new work item or task. A DNS server can then resolve the hostname and the request will be routed to the correct task location service tenant 225. In this example, the request is routed to the task location service tenant 225 for US North, which processes the request and creates the requested work item, job or task.

Figure 3:
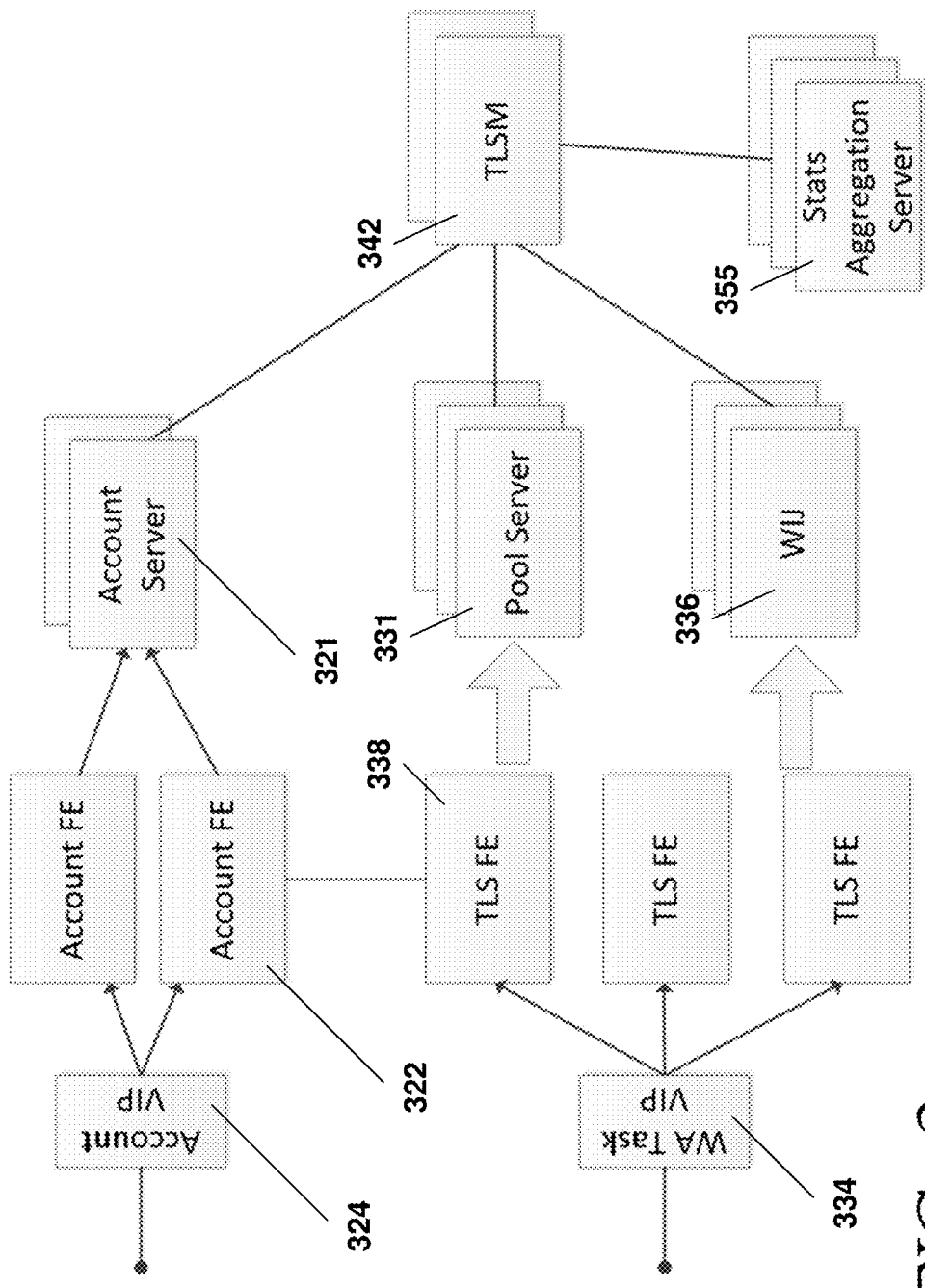
FIG. 3 schematically shows an example of a system or component suitable for use in implementing a cloud computing environment.

FIG. 3 shows a potential configuration for a task location service. In the configuration shown in FIG. 3, a task location service can include one or more account servers 321. The account servers handle account management for accounts in a given geographic region, including creation, deletion, or property updates. Account front ends 322 serve as the front end nodes for account service. The account front ends 322 are behind an account virtual IP address 324 as shown in the figure. The account front ends 322 process the account API requests coming from global location service, such as API requests to create accounts or delete accounts.

The configuration in FIG. 3 also includes one or more pool servers 331. A pool server 331 handles pool management and pool transactions for pools of virtual machines in a given geographic region. A pool server 331 handles pool creation, deletion and property updates. A pool server 331 also manages the high level virtual machine allocation algorithm across multiple task tenants. Virtual machine allocation can take into consideration the connectivity of a virtual machine with storage for a given user. The pool server may also perform other tasks related to allocation of virtual machines.

The configuration in FIG. 3 also includes one or more work item or job schedulers (WIJ) 336. WIJ schedulers 336 handle creation, deletion, and updates of work items and jobs. In addition, if a user has requested automatic creation and/or destruction of pools when work items or jobs start or finish, the WIJ schedulers 336 may initiate the creation and deletion of pools associated with the work items or jobs. The WIJ schedulers 336 also use generic partitioning mechanisms for scaling. In an embodiment, there are multiple WIJ schedulers 336 in each task location service, and each of the WIJ schedulers handles a range of work items.

The pool servers 331 and WIJ schedulers 336 receive requests from users via task location service front ends 338. The task location service front ends 338 are also responsible for calling corresponding components to process requests from users. The task location service front ends 338 are behind an account virtual IP address 334 as shown in the figure.

The configuration in FIG. 3 further includes a task location service master 342. In an embodiment, the task location service master 342 has two main responsibilities. First, the task location service master 325 serves as a master system for implementing partitioning logic for the corresponding servers in a task location service 225. Additionally, the task location service master 342 can be responsible for computing the new market price for preemptible virtual machines at the beginning of each spot period for the entire geographic region of the task location service. It can collect current bids and resource availability information from the pool servers and task tenants, and computes the new market price accordingly. Alternatively, the task location service master can send the bid and resource availability information to a spot price market service. It also makes high level allocation guidance to pool servers about preemptible virtual machines across all task tenants in a geographic region.

In order to track the activity and behavior of the computing environment, a task location service master 342 can communicate with one or more statistics aggregation servers 355. The statistics aggregation servers are responsible for collecting and aggregating detailed statistics for tasks, jobs, work items and pools. The other components in the system emit fine-grained statistics for tasks and virtual machines. The statistics aggregation servers aggregate these fine-grained statistics from task level or virtual machine level statistics into work item, account level, and/or pool level statistics. The statistics can be exposed for use via an API. In addition, the statistics aggregation servers can be responsible for generating hourly metering records for each account for use in billing.

Figure 4:
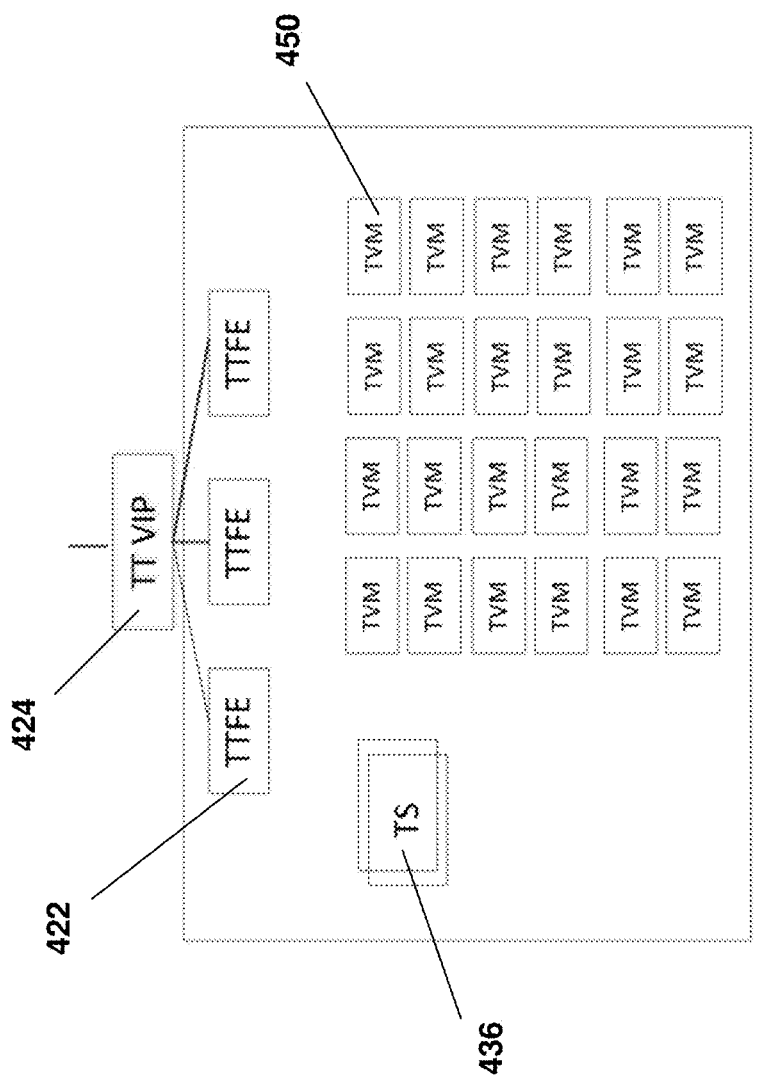
FIG. 4 schematically shows an example of a system or component suitable for use in implementing a cloud computing environment.

FIG. 4 shows an example high level architecture of an embodiment of a task tenant, including an example of components for a task tenant and the corresponding responsibilities. As noted above, a task tenant can assist with managing pools of virtual machines. In the embodiment shown in FIG. 4, a task tenant includes one or more task tenant front ends 422. The task tenant front ends 422 are behind the task tenant virtual IP address 424 which is internally used for communication between a task tenant and its corresponding task location service, including passing through requests between a task location service and a task tenant.

In the embodiment shown in FIG. 4, the task tenant also includes a task scheduler 436. A task scheduler 436 can be responsible for making local task scheduling decisions within a task tenant. The task scheduler 436 decides what task is to run on each virtual machine it controls. For example, a work item or job submitted by a user can have a set of queues which contain the list of tasks to be scheduled. The task scheduler 436 takes tasks from the set of queues, selects one or more available virtual machines in the pool associated with the job, and contacts the virtual machine(s) to schedule these tasks. The task scheduler 436 can also make scheduling decisions based on priority values associated with jobs. Additionally, the task scheduler 436 keeps track of the virtual machines inside a task tenant. The task scheduler 436 works with pool servers to allocate/deallocate virtual machines to/from pools. In addition, the task scheduler 436 maintains heartbeats with all the virtual machines, synchronizes with the virtual machine about pool membership via heartbeats, and controls restarts/reimage of the virtual machines. Still another function of a task scheduler 436 can be to keep track of the size of the task tenant. Based on the current utilization of the virtual machines within a task tenant, the task scheduler can grow or shrink the task tenant, so that the task tenant has sufficient number of virtual machines to run the tasks associated with the task tenant. Similarly, if there are too many virtual machines sitting idle in the task tenant, the machines can be released for use by other hosted services in the data center.

FIG. 4 also shows a plurality of virtual machines associated with a task tenant. In the embodiment shown in FIG. 4, each of the virtual machines includes task virtual machine agent 450 (TVM). In an embodiment, the task virtual machine agent 450 is responsible for launching tasks on the virtual machine, as well as setting up directories structures and permissions for the tasks. It also configures the operating system firewall on the virtual machine to only allow traffic between virtual machines within the same pool (if the pool needs intra-communication). As discussed earlier, the task scheduler 436 maintains heartbeats with the virtual machines via the task virtual machine agents 450. This allows the task scheduler 436 to monitor the health of the virtual machines as well as synchronizing the pool membership information for the task virtual machine agents.

Examples of Execution of Jobs in a Cloud Computing Environment

The following hypothetical examples are provided to illustrate the operation and interaction of dedicated, standby, and preemptible virtual machines in a cloud computing environment. In these examples, a small number of virtual machines will be discussed in order to simplify the description and accompanying figures. However, those of skill in the art will recognize that the concepts described here can be scaled up to any desired number of virtual machines.

A user named Abel has an account for running jobs in the cloud computing environment. The jobs can be for performing any type of computing, such as performing data mining and management for a business, performing a scientific calculation, or handling retail consumer traffic. In an initial request, Abel requests 5 dedicated machines and 3 standby machines. In this example, the computations have associated data held in storage, and Abel indicates a preference for machines that have a higher communication speed and/or a better connectivity with the storage servers for Abel's data.

Figure 5:
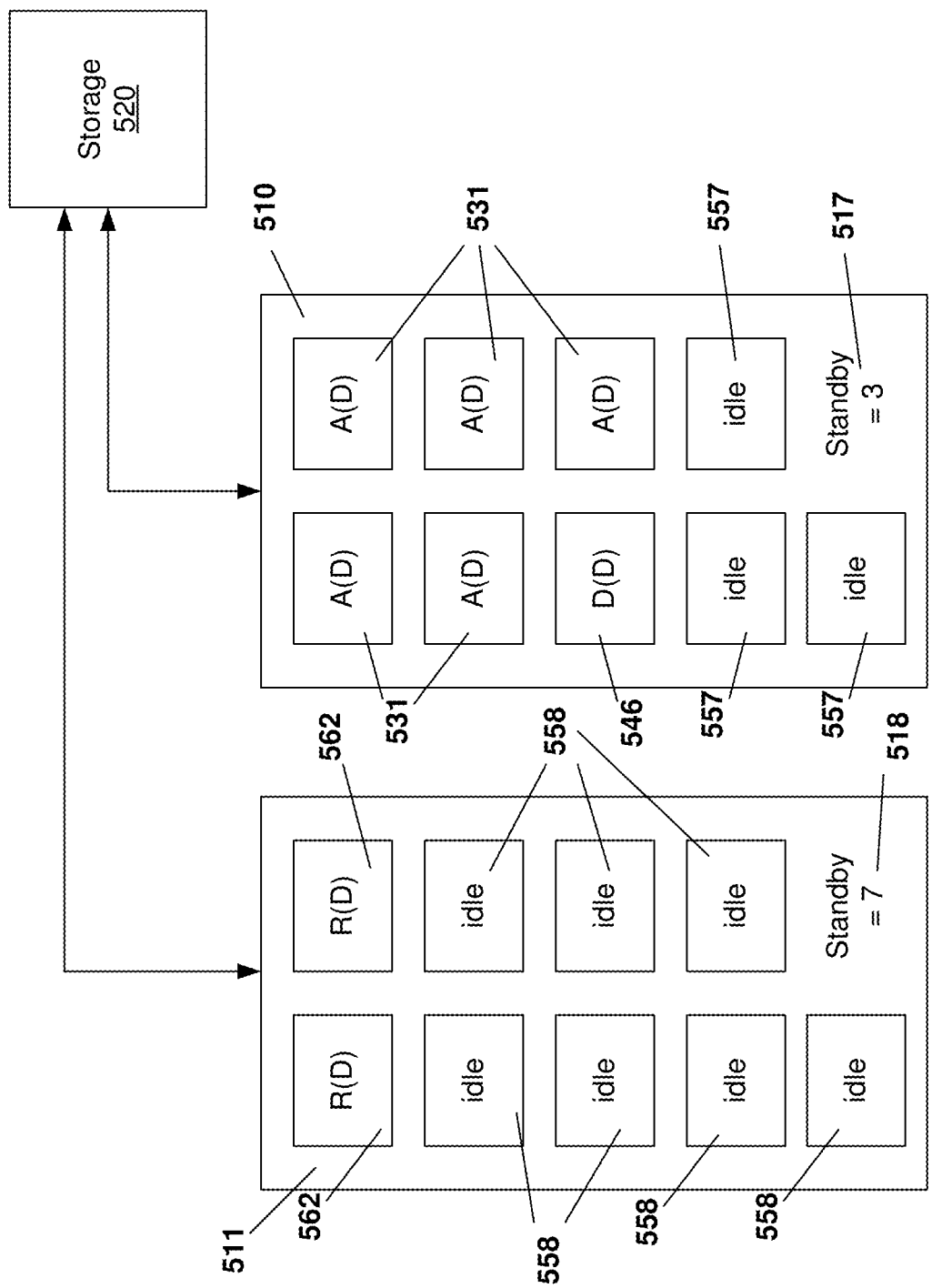
FIGS. 5-9 schematically show examples of managing one or more pools of virtual machines in accordance with an embodiment of the invention.

FIG. 5 shows an example of assigning and associating machines to satisfy Abel's request. In FIG. 5, virtual machines within two different task tenants 510 and 511 are shown. Task tenant 510 has a higher data transfer rate and/or another feature that corresponds to improved connectivity with storage 520 where Abel's data is stored. A user, such as Abel, that desires to take advantage of this improved connectivity can submit a request with an affinity for task tenant 510. FIG. 5 shows nine virtual machines each within task tenants 510 and 511. The virtual machines shown in FIG. 5 are representative, and any convenient number of additional machines can be managed by either task tenant 510 or task tenant 511.

In FIG. 5, machines can be shown in several states within a task tenant. Virtual machines assigned to a pool corresponding to a user can be either dedicated machines—indicated by the designation (?)D—or preemptible machines—indicated by (?)P. Additionally, machines within a task tenant can be idle. Each task tenant also includes a count that tracks the number of requested standby reservations associated with a task tenant. If a standby reservation is not part of a request with affinity for a particular task tenant (or other virtual machine cluster), standby reservations can be associated with any convenient task tenant. Optionally, a global count and/or a per user count could be used to track the number of standby reservations. Such a global count and/or per user count could be used in place of or in addition to tracking standby reservations for a task tenant. For standby reservations with an affinity for a task tenant, tracking the standby reservations associated with a task tenant is preferred.

In FIG. 5, the 5 dedicated virtual machines requested by Abel are assigned from available virtual machines in task tenant 510. These dedicated machines are indicated by reference number 531 in FIG. 5 and include the designation A(D) to represent Abel-dedicated. Virtual machine 546 is a dedicated machine associated with user David—D(D). In the initial configuration shown in FIG. 5, the three remaining virtual machines 557 are idle. The three standby reservations for the pool corresponding to user Abel are also tracked by the standby count 517. The standby reservations for Abel are associated with task tenant 510 due to the requested affinity for the task tenant. Task tenant 511 includes 2 machines 562 assigned as dedicated machines to one or more other users. These machines are noted as R(D). The remaining virtual machines 558 in task tenant 511 are idle. Due to standby reservations from other users, the standby count 518 for task tenant 511 is seven. The standby count for task tenant 511 may indicate standby reservations with affinity for task tenant 511, or the standby count may reflect a nominal association of standby reservations with the task tenant 511, so that some task tenant has responsibility for holding a sufficient number of non-dedicated machines to satisfy all current standby reservations.

After assigning the victual machines to Abel's account, any work items submitted by Abel are performed on the dedicated machines 531. If no work items are available, the dedicated virtual machines remain idle.

Figure 6:
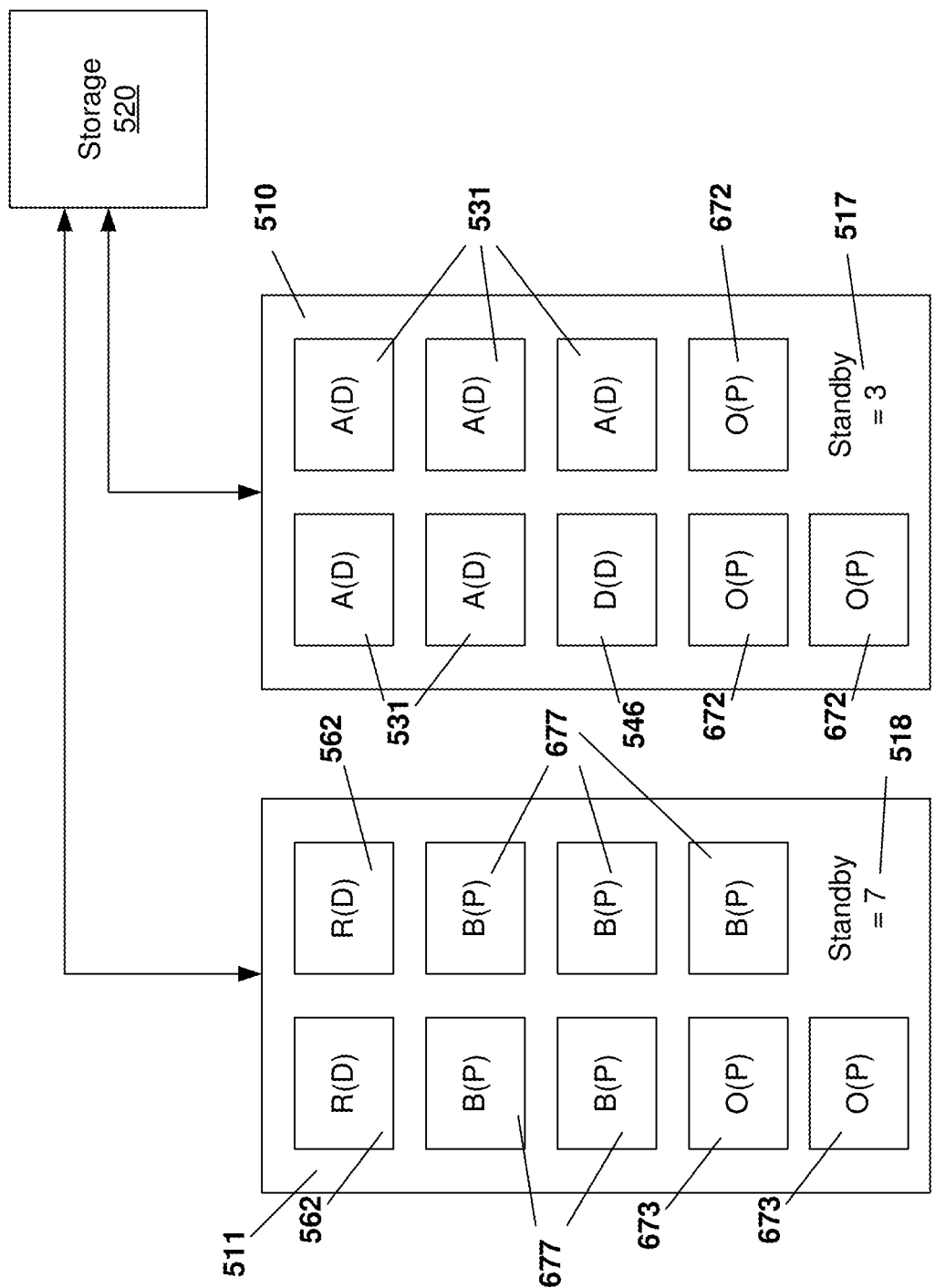

After a period of time, users Baker and Oliver decide to use some additional computing resources. The timing for use of the additional resources is not urgent, so Baker and Oliver each request 5 preemptible virtual machines. During the next assignment time period, the bids provided from both Oliver and Baker are sufficient to win assignment of the requested five preemptible virtual machines. In this example, the bid provided from Oliver is higher than the bid provided by Baker. This results in the preemptible machines for Oliver having a higher priority than the preemptible machines for Baker. FIG. 6 shows that user Oliver now has virtual machines 672 and 673 assigned as preemptible machines—O(P)—in task tenants 510 and 511. These machines are assigned to a pool corresponding to Oliver. Similarly, virtual machines 677 in task tenant 511 are assigned to a pool corresponding to Baker, as indicated by the B(P) designation.

Figure 7:
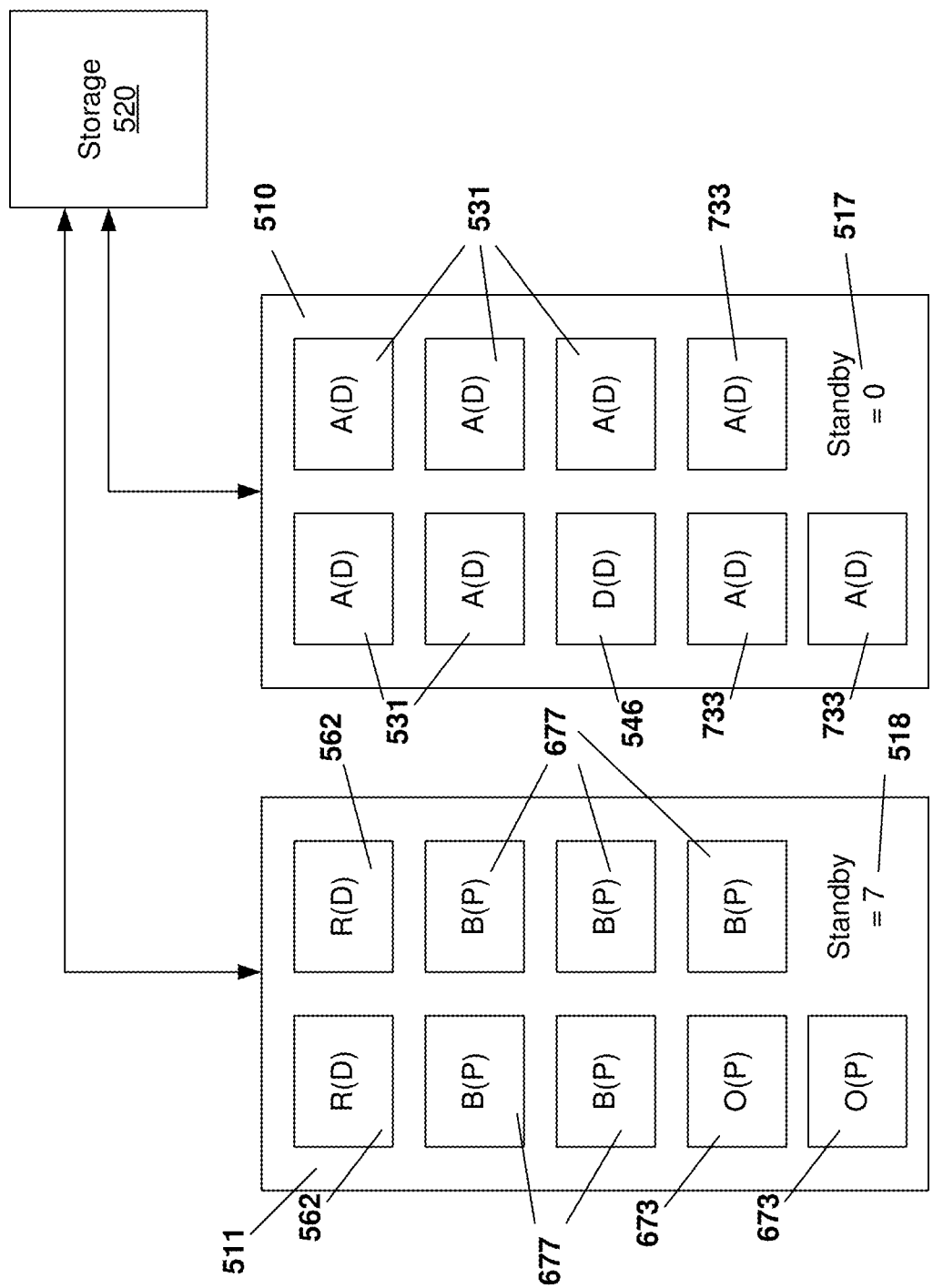

FIG. 7 shows an example of the configuration for virtual machines assigned to Abel after a request by Abel for conversion of the standby reservations to dedicated virtual machines. Virtual machine 546 is assigned as a dedicated machine to David, and therefore is not impacted by the request from Abel for additional dedicated machines. Instead, the three preemptible virtual machines from task tenant 510 that were assigned to Oliver are converted to dedicated virtual machines 733 assigned to Abel. Because Abel converted all standby reservations to dedicated virtual machines and did not request any additional standby reservations, the standby count for task tenant 510 is reduced to zero.

Figure 8:
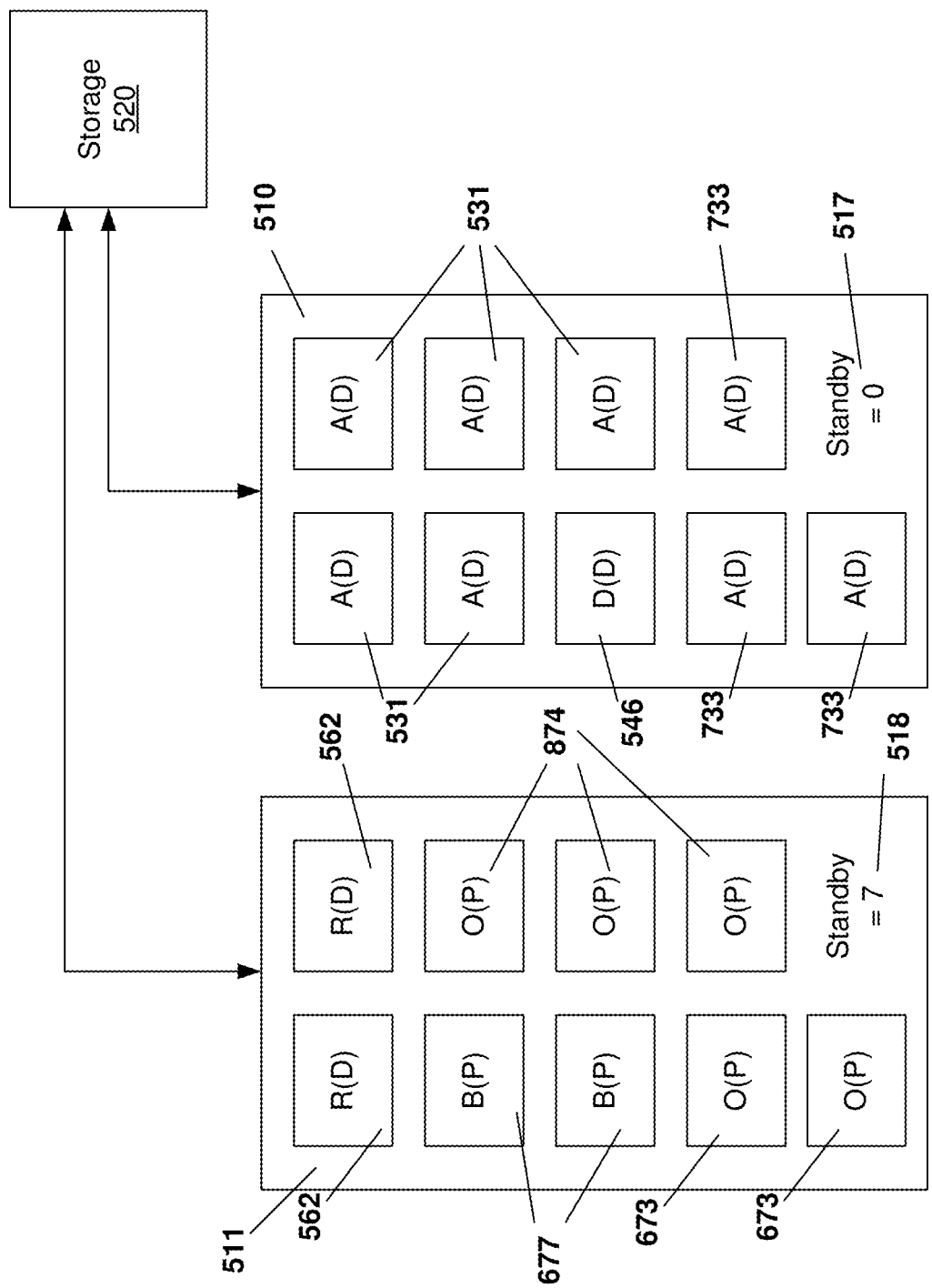

In the example shown in FIG. 7, the virtual machines assigned to Oliver in task tenant 510 were selected for preemption due to the affinity requested by Abel. However, Oliver's bid for preemptible virtual machines was greater than Baker's, leading to a higher priority for the preemptible virtual machines assigned to Oliver. In order to restore Oliver's higher priority preemptible virtual machines, three virtual machines can be assigned to Oliver from task tenant 511. Typically a change in assignment of preemptible machines from one pool to preemptible machines in another pool occurs at the start of a new assignment time period. However, due to the displacement of Oliver by Abel's request for dedicated virtual machines, preemptible machines in task tenant 511 can be reassigned to Oliver without waiting for the end of an assignment time period. This is shown in FIG. 8 by the assignment of machines 874 to Oliver as preemptible virtual machines. In this example, the virtual machines reassigned to Oliver would be selected by selecting virtual machines with the lowest priority. This could represent virtual machines that are idle, preemptible virtual machines corresponding to the lowest bid, or preemptible virtual machines with the lowest priority for another reason.

Figure 9:
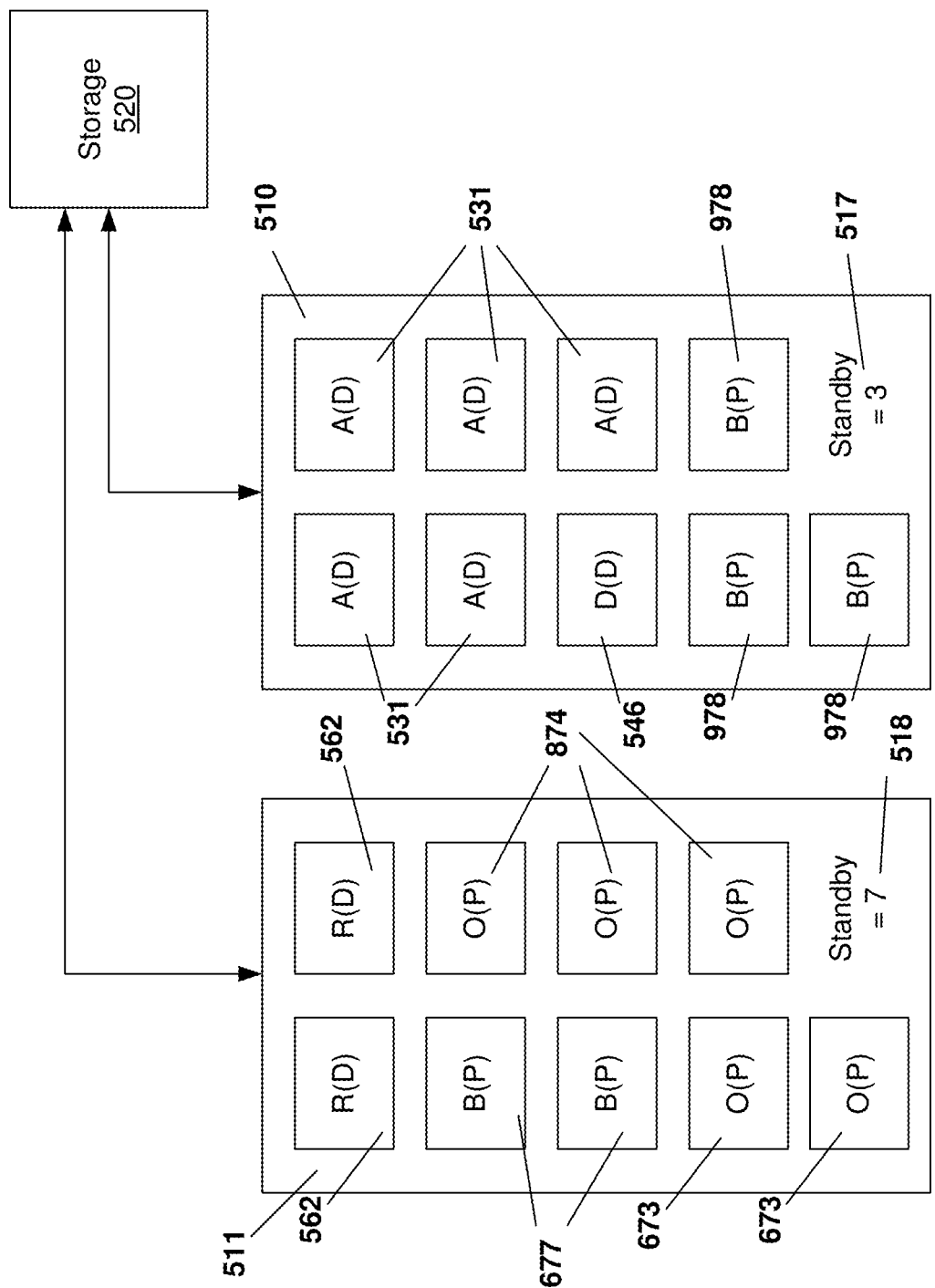

After completing a number of desired computational jobs, Abel's need for computing resources returns to the original level. Either manually or automatically, Abel requests a reduction in resources to 5 dedicated machines and 3 standby machines. The result of this reduction request is schematically shown in FIG. 9. The reduction in dedicated resources requested by Abel results in an increase in the number of available virtual machines. This allows the remaining portion of Baker's request for preemptible machines to be fulfilled, as indicated by virtual machines 978. The standby count for task tenant 510 is also increased to three again to reflect the standby reservations requested by Abel with an affinity for task tenant 510.

Additional Embodiments

Having briefly described an overview of various embodiments of the invention, an exemplary operating environment suitable for implementing a virtual machine is now described. Referring to the drawings in general, and initially to FIG. 10 in particular, an exemplary operating environment for implementing embodiments of the present invention is shown and designated generally as computing device 1000. Computing device 1000 is but one example of a suitable computing environment and is not intended to suggest any limitation as to the scope of use or functionality of the invention. Neither should the computing device 1000 be interpreted as having any dependency or requirement relating to any one or combination of components illustrated.

Embodiments of the invention may be described in the general context of computer code or machine-useable instructions, including computer-executable instructions such as program modules, being executed by a computer or other machine, such as a personal data assistant or other handheld device. Generally, program modules, including routines, programs, objects, components, data structures, etc., refer to code that perform particular tasks or implement particular abstract data types. The invention may be practiced in a variety of system configurations, including handheld devices, consumer electronics, general-purpose computers, more specialty computing devices, and the like. The invention may also be practiced in distributed computing environments where tasks are performed by remote-processing, devices that are linked through a communications network.

Figure 10:
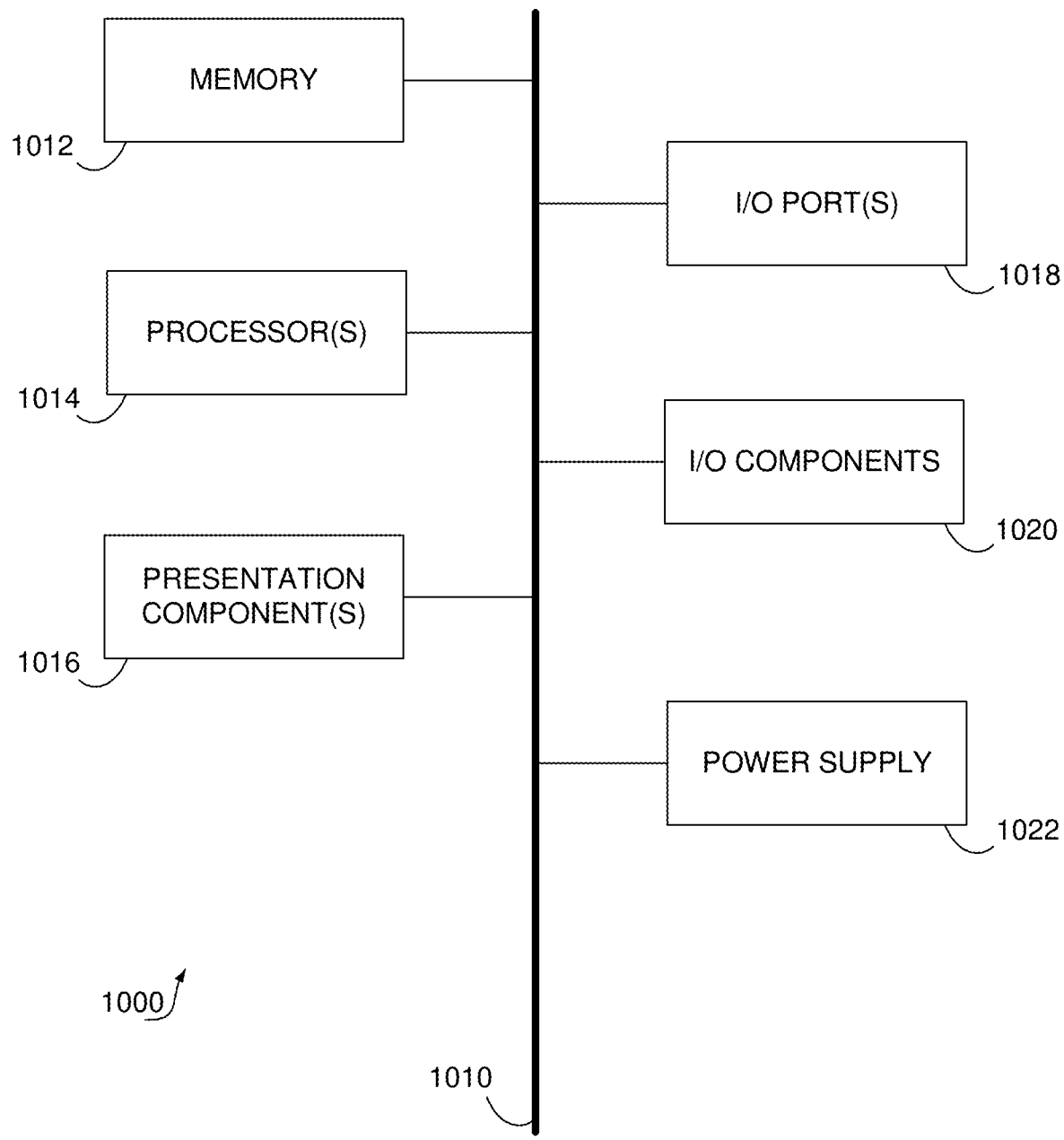
FIG. 10 schematically shows a computing device suitable for performing embodiments of the invention.

With continued reference to FIG. 10, computing device 1000 includes a bus 1010 that directly or indirectly couples the following devices: memory 1012, one or more processors 1014, one or more optional presentation components 1016, input/output (I/O) ports 1018, optional I/O components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Additionally, many processors have memory. The inventors hereof recognize that such is the nature of the art, and reiterate that the diagram of FIG. 10 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 10 and reference to "computing device."

The computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, Random Access Memory (RAM), Read Only Memory (ROM), Electronically Erasable Programmable Read Only Memory (EEPROM), flash memory or other memory technology, CD-ROM, digital versatile disks (DVD) or other holographic memory, magnetic cassettes, magnetic tape, magnetic disk storage or other magnetic storage devices, or any other medium that can be used to encode desired information and which can be accessed by the computing device 500. In an embodiment, the computer storage media can be selected from tangible computer storage media. In another embodiment, the computer storage media can be selected from non-transitory computer storage media.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RE, infrared and other wireless media. Combinations of the any of the above should also be included within the scope of computer-readable media.

The memory 1012 can include computer-storage media in the form of volatile and/or nonvolatile memory. The memory may be removable, non-removable, or a combination thereof. Exemplary hardware devices include solid-state memory, hard drives, optical-disc drives, etc. The computing device 1000 includes one or more processors that read data from various entities such as the memory 1012 or the I/O components 1020. The presentation component(s) 1016 present data indications to a user or other device. Exemplary presentation components include a display device, speaker, printing component, vibrating component, and the like.

The I/O ports 1018 can allow the computing device 1000 to be logically coupled to other devices including the I/O components 1020, some of which may be built in. Illustrative components can include a microphone, joystick, game pad, satellite dish, scanner, printer, wireless device, etc.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Figure 11:
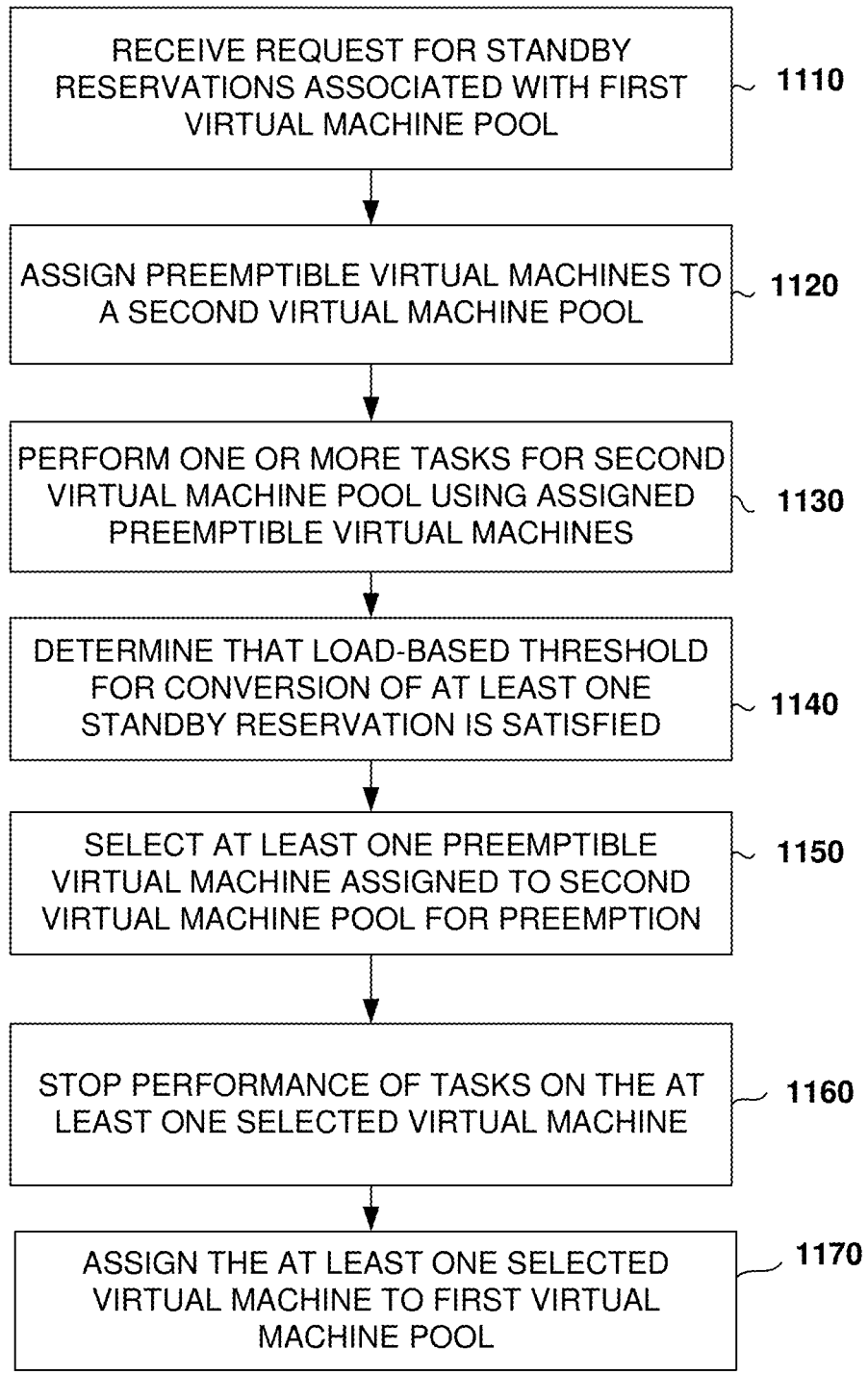
FIGS. 11-13 show examples of process flows according to the invention.

FIG. 11 shows an example of a method according to the invention. In FIG. 11, a request is received 1110 for one or more standby reservations of Virtual machines associated with a first virtual machine pool corresponding to a first user. One or more preemptible virtual machines are assigned 1120 to a second virtual machine pool corresponding to a second user. One or more tasks are performed 1130 for the second virtual machine pool on the assigned preemptible virtual machines. It is then determined 1140 that a load-based threshold is satisfied. The load-based threshold corresponds to a threshold for converting standby reservations to dedicated machines assigned to the first virtual machine pool. At least one preemptible virtual machine assigned to the second virtual machine pool is selected 1150 for preemption. The selection can be based on, for example, the selected virtual machines having the lowest priority, such as being associated with a lowest bid or having performed a task for a shorter length of time. Additionally or alternately, the selection can be based on an affinity of the first virtual machine pool for a virtual machine cluster that contains machines assigned to the second virtual machine pool. The affinity can be based, for example, on an improved connectivity of a virtual machine cluster to a data storage location or based on an affinity for having virtual machines in the first virtual machine pool in the same (or a few) virtual machine clusters. Performance of tasks on the at least one selected virtual machine is stopped 1160. The at least one selected virtual machine is then assigned 1170 to the first virtual machine pool as a dedicated virtual machine.

Figure 12:
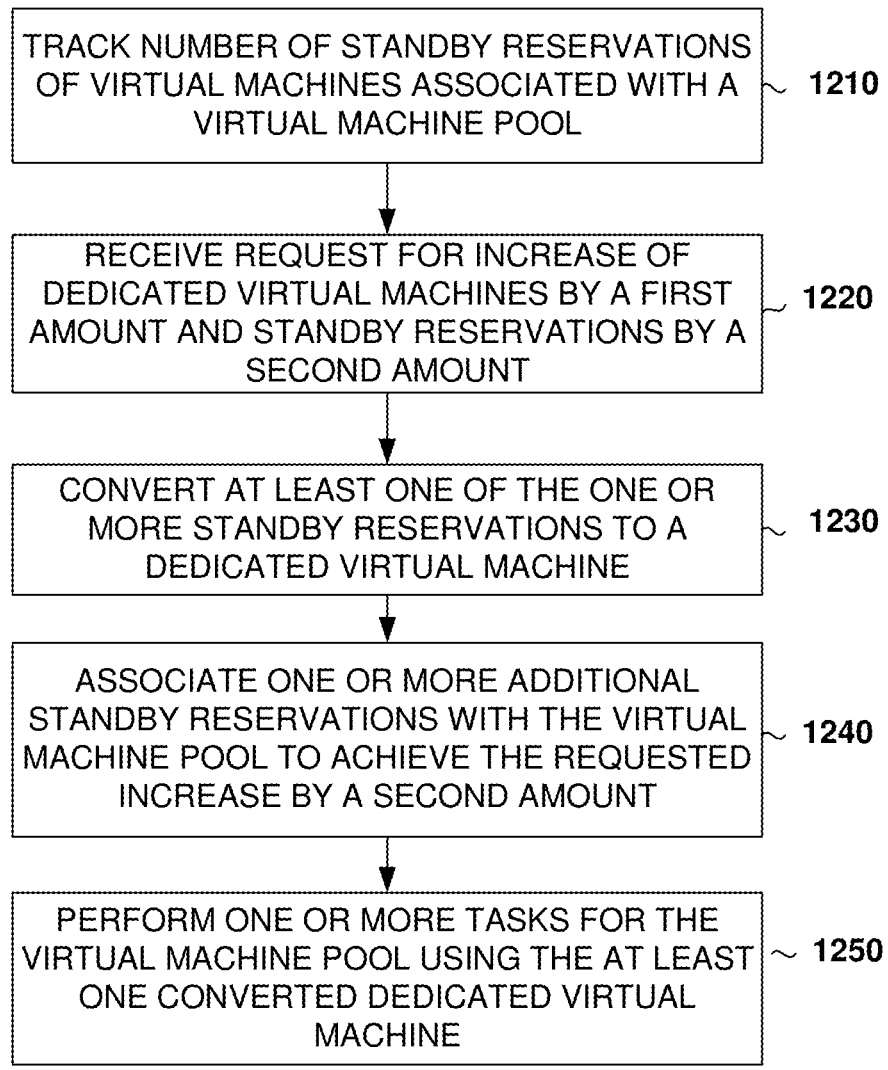

FIG. 12 shows another example of a method according to the invention. In FIG. 12, a number of standby reservations of virtual machines associated with a virtual machine pool corresponding to a user is tracked 1210. A request is received 1220 from the user to increase the number of dedicated virtual machines by a first amount and the number of standby reservations by a second amount. Optionally, the request can be in the form of multiple communications from the user and/or multiple automatically triggered messages. At least one of the one or more standby reservations is converted 1230 to a dedicated virtual machine assigned to the virtual machine pool. One or more additional standby reservations are associated 1240 with the virtual machine pool, the number of associated additional standby reservations being sufficient to achieve the requested increase by the second amount. One or more tasks are performed 1250 for the virtual machine pool using the at least one converted dedicated virtual machine.

Figure 13:
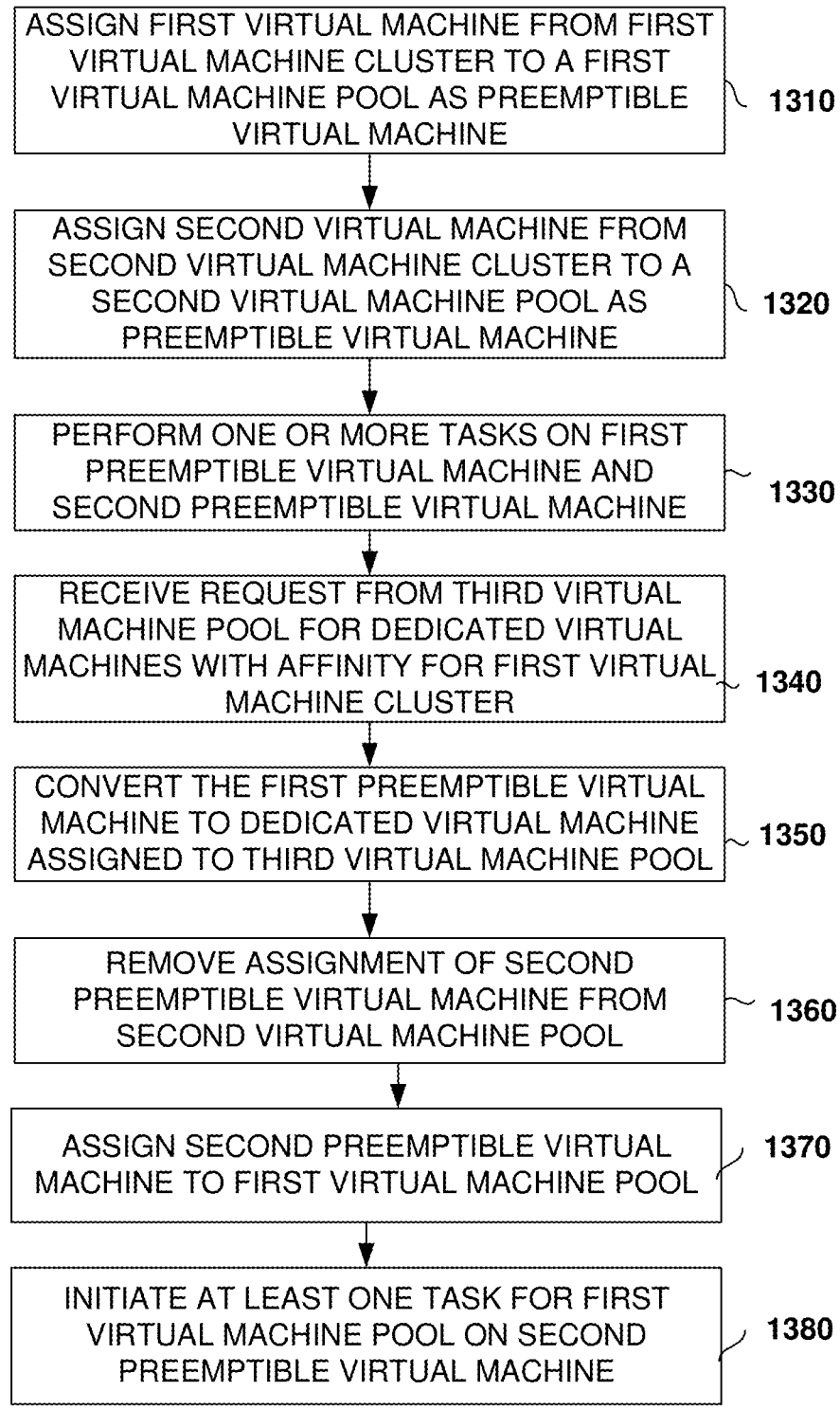

FIG. 13 shows yet another example of a method according to the invention. In FIG. 13, a first virtual machine from a first virtual machine cluster is assigned 1310 to a first virtual machine pool as a preemptible virtual machine. The assignment can be made for an assignment time period. A second virtual machine from a second virtual machine cluster is also assigned 1320 to a second virtual machine pool as a preemptible virtual machine for the assignment time period. One or more tasks are performed 1330 on the first preemptible virtual machine and the second preemptible virtual machine. The one or more tasks on the first preemptible virtual machine have a greater priority than the tasks on the second preemptible virtual machine. A request is then received 1340 from a third virtual machine pool for one or more dedicated virtual machines. The first preemptible virtual machine is then converted 1350 to a dedicated virtual machine assigned to the third virtual machine pool. The assignment of the second preemptible virtual machine is removed 1360 from the second virtual machine pool. The second preemptible virtual machine is then assigned 1370 to the first virtual machine pool. At least one task for the first virtual machine pool is then initiated 1380 on the second preemptible virtual machine. The at least one task is initiated prior to the end of the assignment time period.

In an embodiment, a method for providing resources in a cloud computing environment is provided. The method includes receiving a request from a first user for one or more standby reservations of virtual machines associated with a first virtual machine pool corresponding to the first user; assigning one or more preemptible virtual machines to a second virtual machine pool corresponding to a second user; performing one or more tasks for the second virtual machine pool using the assigned preemptible virtual machines; determining that a load-based threshold for conversion of at least one standby reservation for the first virtual machine pool is satisfied; selecting at least one preemptible virtual machine assigned to the second virtual machine pool for preemption based on at least one of a bid price associated with the second virtual machine pool and a length of time for performing a task on a preemptible virtual machine; stopping performance of tasks on the at least one selected virtual machine; and assigning the at least one selected virtual machine to the first virtual machine pool as a dedicated virtual machine.

In another embodiment, a method for providing resources in a cloud computing environment is provided. The method includes tracking a number of standby reservations of virtual machines associated with a virtual machine pool corresponding to a user; receiving a request from the user for an increase of dedicated machines assigned to the virtual machine pool by a first amount and an increase in the number of standby reservations associated with the virtual machine pool by a second amount; converting at least one of the one or more standby reservations to a dedicated virtual machine assigned to the virtual machine pool; associating one or more additional standby reservations with the virtual machine pool, the number of additional standby reservations being sufficient to achieve the increase in the number of standby reservations by the second amount; and performing one or more tasks for the virtual machine pool using the at least one converted dedicated virtual machine.

In still another embodiment, a method for providing resources in a cloud computing environment is provided. The method includes assigning a first virtual machine from a first virtual machine cluster to a first virtual machine pool as a preemptible virtual machine for an assignment time period; assigning a second virtual machine from a second virtual machine cluster to a second virtual machine pool as a preemptible virtual machine for the assignment time period; performing one or more tasks on the first preemptible virtual machine and on the second preemptible virtual machine, the one or more tasks on the first preemptible virtual machine having a greater priority than the one or more tasks on the second preemptible virtual machine; receiving a request from a third virtual machine pool for one or more dedicated virtual machines, the request including an affinity for the first virtual machine cluster; converting the first preemptible virtual machine to a dedicated virtual machine assigned to the third virtual machine pool; removing the assignment of the second preemptible virtual machine from the second virtual machine pool; assigning the second preemptible virtual machine to the first virtual machine pool; and initiating at least one task for the first virtual machine pool on the second preemptible virtual machine prior to the end of the assignment time period.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

What is claimed is:
1. A system comprising:
a processor; and
memory coupled to the processor, the memory comprising computer executable instructions that, when executed by the processor, perform a method comprising:

receiving a request for an increase of dedicated machines assigned to a virtual machine pool by a first amount;

converting a first standby reservation of a first virtual machine associated with the virtual machine pool to a dedicated virtual machine assigned to the virtual machine pool, and wherein the first virtual machine comprises an idle virtual machine or a preemptible virtual machine, and wherein the first standby reservation grants the virtual machine pool the right to receive one or more virtual machines as dedicated virtual machines based on demand;

associating a second standby reservation of a second virtual machine with the virtual machine pool; and performing a task for the virtual machine pool using the dedicated virtual machine.

2. The system of claim 1, the method further comprising:
prior to receiving the request for an increase of dedicated machines, tracking a number of standby reservations of virtual machines associated with the virtual machine pool.

3. The system of claim 2, wherein at least one standby reservation in the tracked number of standby reservations indicates an affinity for the virtual machine pool.

4. The system of claim 3, wherein the affinity is based on at least one of:
improved access to data storage; or
location within a virtual cluster.

5. The system of claim 4, wherein virtual machines of the virtual cluster correspond to physical machines in a geographical location.

6. The system of claim 2, wherein tracking the number of standby reservations causes the system to provide at least one of a number of idle virtual machines or a number preemptible virtual machines for satisfying a requested number of standby reservations for the virtual machine pool.

7. The system of claim 1, wherein converting the first standby reservation of the first virtual machine comprises:
stopping a preemptible job running on the first virtual machine; and
starting a job associated with the virtual machine pool on the dedicated virtual machine.

8. The system of claim 1, wherein converting the first standby reservation of the first virtual machine comprises satisfying at least one of time-based criteria or load-based criteria.

9. The system of claim 8, wherein the time-based criteria correspond to at least one of a predetermined time or date.

10. The system of claim 8, wherein the load-based criteria correspond to a threshold based on at least one of usage or performance of one or more cloud resources.

11. The system of claim 1, wherein converting the first standby reservation of the first virtual machine is further based upon
a user request to convert the first virtual machine to the dedicated virtual machine.

12. The system of claim 1, wherein converting the first standby reservation of the first virtual machine comprises:
identifying a first priority associated with the first virtual machine;
identifying a second priority associated one or more other virtual machines; and
selecting the first virtual machine based on the first priority being higher than the second priority.

13. The system of claim 12, wherein the first priority and the second priority are based on at least one of a virtual machine activity level or a bid price.

14. The system of claim 1, wherein associating the second standby reservation of the second virtual machine does not include allocating the second virtual machine to the virtual machine pool when the second standby reservation of the second virtual machine is associated with the virtual machine pool.

15. A method comprising:
receiving a request for an increase of dedicated machines assigned to a virtual machine pool by a first amount;

converting a first standby reservation of a first virtual machine associated with the virtual machine pool to a dedicated virtual machine assigned to the virtual machine pool, and wherein the first virtual machine comprises an idle virtual machine or a preemptible virtual machine, and wherein the first standby reservation comprises a reservation for the virtual machine pool to receive one or more virtual machines as dedicated virtual machines based on demand;

associating a second standby reservation of a second virtual machine with the virtual machine pool; and performing a task for the virtual machine pool using the dedicated virtual machine.

16. The method of claim 15, wherein the method further comprises:
receiving a request for an increase of standby reservations assigned to the virtual machine pool by a second amount.

17. The method of claim 16, wherein the method further comprises:
after converting the first standby reservation of the first virtual machine, assigning a number of standby reservations of additional virtual machines to the virtual machine pool, the number of standby reservations of additional virtual machines satisfying the second amount.

18. The method of claim 17, wherein each of the standby reservations of additional virtual machines reserves an idle or preemptible virtual machine to be allocated to the virtual machine pool.

19. The method of claim 15, wherein converting a first standby reservation of a first virtual machine comprises:
waiting for a non-preemptible job running on the first virtual machine to finish before dedicating the first virtual machine to the virtual machine pool.

20. A hardware computer-storage media storing computer-executable instructions that, when executed by a computing device, perform a method comprising:
receiving a request for an increase of dedicated machines assigned to a virtual machine pool by a first amount;

converting a first standby reservation of a first virtual machine associated with the virtual machine pool to a dedicated virtual machine assigned to the virtual machine pool, and wherein the first virtual machine comprises an idle virtual machine or a preemptible virtual machine, and wherein the first standby reservation grants the virtual machine pool the right to receive one or more virtual machines as dedicated virtual machines based on demand;

associating a second standby reservation of a second virtual machine with the virtual machine pool; and performing a task for the virtual machine pool using the dedicated virtual machine.

* * * * *